US012628958B2

(12) United States Patent
Cory

(10) Patent No.: US 12,628,958 B2
(45) Date of Patent: May 19, 2026

(54) BED SYSTEMS AND METHODS

(71) Applicant: Carolynn R. Cory, Bellingham, WA (US)

(72) Inventor: Carolynn R. Cory, Bellingham, WA (US)

( * ) Notice: Subject to any disclaimer, the term of this patent is extended or adjusted under 35 U.S.C. 154(b) by 237 days.

(21) Appl. No.: 18/058,494

(22) Filed: Nov. 23, 2022

(65) Prior Publication Data

US 2023/0157455 A1 May 25, 2023

Related U.S. Application Data

(60) Provisional application No. 63/282,632, filed on Nov. 23, 2021.

(51) Int. Cl.
*A47C 20/00* (2006.01)
*A47C 20/02* (2006.01)
(Continued)

(52) U.S. Cl.
CPC ............ *A47C 20/00* (2013.01); *A47C 20/023* (2013.01); *A47C 20/027* (2013.01); *A47C 27/001* (2013.01);
(Continued)

(58) Field of Classification Search
CPC ... A47C 20/026; A47C 20/023; A47C 20/027; A47C 27/001; A47C 20/00; A47C 27/00; A47C 27/146; A47C 20/02; A47C 20/021; A47C 27/144; A47C 27/20; A47C 16/00; A47C 17/045; A47C 19/04; A47C 19/045; A47C 20/025; A47C 20/08; A47C 21/00;
(Continued)

(56) References Cited

U.S. PATENT DOCUMENTS

| | | | | |
|---|---|---|---|---|
| 5,661,860 A * | 9/1997 | Heitz | ................. | A61G 7/05723 5/632 |
| 5,727,267 A | 3/1998 | Keilhauer | | |

(Continued)

FOREIGN PATENT DOCUMENTS

| | | | | |
|---|---|---|---|---|
| CN | 108403322 A * | 8/2018 | ............... | A61G 7/00 |
| JP | 2004154600 A | 6/2004 | | |
| JP | 4083129 B2 | 4/2008 | | |

OTHER PUBLICATIONS amazon.com, Bollaer Nap Sleeping Pillow Cushion for Office, Memory Foam Slow Rebound Face Down Desk Pillow Cushion Nap Sleeping Pillow, Removable Washable Velvet Cover, https://www.amazon.com/BOLLAER-Sleeping-Cushion-Removable-Washable/dp/B07RDBP1FT/ref=mp_s_a_1_4?keywords=face+down+pillow+for+sleeping&qid=1643913506&sr=8-4.

(Continued)

*Primary Examiner* — Justin C Mikowski
*Assistant Examiner* — Deborah Talitha Gedeon
(74) *Attorney, Agent, or Firm* — Bronte Brillantes; Michael R. Schacht; Schacht Law Office, Inc.

(57) ABSTRACT

A bed system for supporting at least one user in a face down orientation comprises a mattress system and a base system. The mattress system defines at least one sleeping surface and at least one opening. The base system is configured to support the mattress system such that a fresh air space is formed under the opening. The mattress system is configured to support the at least one user in the face down orientation with at least a portion of the at least one user being arranged within the at least one opening.

19 Claims, 9 Drawing Sheets

(51) Int. Cl.
*A47C 27/00* (2006.01)
*A61G 13/00* (2006.01)

(52) U.S. Cl.
CPC .... *A61G 13/009* (2013.01); *A61H 2201/0142* (2013.01); *A61H 2201/0146* (2013.01)

(58) Field of Classification Search
CPC ... A47C 27/082; A47C 27/125; A47C 27/142; A47C 31/008; A47C 7/383; A61G 13/009; A61G 7/05723; A61G 7/05; A61G 2200/325; A61G 13/121; A61G 7/072; A61G 13/12; A61G 2200/12; A61G 13/10; A61G 13/105; A61G 13/06; A61G 13/1235; A61G 13/122; A61G 13/1265; A61G 2203/70; A61G 2210/90; A61G 7/00; A61G 7/075; A61G 13/0009; A61G 13/08; A61G 13/127; A61G 13/1285; A61G 13/129; A61G 2200/16; A61G 2203/12; A61G 2210/70; A61G 7/07; A61G 13/0054; A61G 13/104; A61G 13/107; A61G 13/1225; A61G 13/123; A61G 13/1245; A61G 13/128; A61G 2200/32; A61G 2200/327; A61G 2203/30; A61G 2203/723; A61G 2210/10; A61G 7/001; A61G 7/015; A61G 7/005; A61G 7/065; A61G 7/1032; A61H 2201/0142; A61H 2201/0146; A61H 2205/081; A61H 2205/083; A61H 1/00; A61H 2203/0456; A61H 2203/0468; A61H 2205/082; A61H 39/04; A61H 7/001; A61H 2201/0107; A61H 2201/0138; A61H 2201/0157; A61H 2201/0161; A61H 2201/0207; A61H 2201/0228; A61H 2201/1207; A61H 2201/1246; A61H 2201/1284; A61H 2201/1607; A61H 2201/1609; A61H 2201/1619; A61H 2201/1623; A61H 2201/1628; A61H 2201/1645; A61H 2201/1654; A61H 2201/1671; A61H 2201/1676; A61H 2201/1695; A61H 2201/503; A61H 2201/5035; A61H 2201/5056; A61H 2205/04; A61H 2205/084; A61H 2205/088; A61H 2205/10; A61H 23/02; A61H 37/00; A61H 39/02; A61H 39/06; A61H 7/007; A61H 9/0078; A61H 99/00
See application file for complete search history.

(56) References Cited

U.S. PATENT DOCUMENTS

| | | | | | |
|---|---|---|---|---|---|
| 6,148,460 | A * | 11/2000 | Fried | A61G 13/009 5/643 |
| 6,566,833 | B2 | 5/2003 | Bartlett | |
| 7,614,105 | B1 * | 11/2009 | Jackson | A47C 7/383 5/640 |
| 2003/0088919 | A1 * | 5/2003 | Lin | A61G 13/009 5/613 |
| 2006/0031993 | A1 * | 2/2006 | Riach | A47C 27/20 5/632 |
| 2009/0211584 | A1 * | 8/2009 | Savich | A61G 13/12 128/845 |
| 2010/0037397 | A1 | 2/2010 | Wood | |
| 2021/0307520 | A1 * | 10/2021 | Batey | A47C 27/001 |

OTHER PUBLICATIONS amazon.com, Hermell Products, Inc. Hermell Face Down Pillow, Large (Pack of 1), White, https://www.amazon.com/Hermell-Cushion-Sloping-Minimizes-Removable/dp/B001B2PKBU/ref=mp_s_a_1_5?keywords=face+down+pillow+for+sleeping&qid=1643913506&sr=8-5.

amazon.com, Oakworks Prone Pillow, Face Down Recovery, Prone Position Cushion, Comfortable Face Rest, https://www.amazon.com/Oakworks-Prone-Pillow/dp/B009KZNO54/ref=mp_s_a_1_14?keywords=face+down+pillow+for+sleeping&qid=1643913506&sr=8-14.

amazon.com, SXZCYX Face Down Pillow After Eye Surgery, Inflatable Retinal Detachment Pillow, Portable Prone Pillow Face Down Sleep Vitrectomy Macular Hole Recovery Equipment for Post Eye Surgery Recovery, https://www.amazon.com/Inflatable-Detachment-Vitrectomy-Equipment-SXZCYX/dp/B0998XZH86/ref=mp_s_a_1_3?keywords=face%2Bdown%2Bpillow%2Bfor%2Bsleeping&qid=1643913506&sr=8-3&th=1.

Mcfee Medical Technologies, Face Down Recovery Equipment, https://mcfeetech.com/face-down-recovery-equipment/.

* cited by examiner

BED SYSTEMS AND METHODS

RELATED APPLICATIONS

This application, U.S. patent application Ser. No. 18/058,494 filed Nov. 23, 2022, claims benefit of U.S. Provisional Application Ser. No. 63/282,632 filed Nov. 23, 2021, the contents of which are incorporated herein by reference.

TECHNICAL FIELD

This application relates to bed systems and methods and, in particular, to bed systems and methods that facilitate face down sleeping.

BACKGROUND

Bed systems typically include a mattress sized and dimensioned to support a lying person (hereinafter "the user"). A mattress typically takes the shape of a rectangular pad defining a sleep surface and comprising a case and filler material arranged within the case. The sleep surface is typically generally planar. The case is typically made of heavy cloth, and the filler may be made of one or more materials selected to comfortably support the lying person such as hair, straw, cotton, wool, foam rubber, and/or a framework of metal springs. Mattresses are typically sold in a predetermined sizes such as single/twin, double/full, queen, and king and in varying thicknesses. The case and filler of a typical mattress typically form a system that cannot practically be cut or otherwise modified.

Typically, but not necessarily, the mattress is supported by a bed base, such as a support box or slatted foundation. The bed base supporting the mattress is typically the same size as the mattress. Most bed bases are configured to support the sleep surface in a substantially horizontal arrangement. The bed base typically incorporates or is supported by a bed frame. Bed frames are typically metal, wood, or a combination of metal and wood. Bed frames may be sold in a size compatible with the mattress and/or base or may be reconfigured to support two or more mattress sizes. Bed frames may also be configured such that the sleeping surface may be adjusted to a desired height relative to the floor surface supporting the bed system. Paired with an appropriate mattress, certain bed bases are adjustable to allow one or more portions of the sleeping surface to be angled with respect to horizontal.

Bed systems are sold in a number of configurations designed to accommodate the sleep preferences of different users. Some users prefer a soft bed, while others prefer a firm bed. Bed systems for a child may be smaller (e.g., single, double, or full size), while bed systems for two users are typically larger (e.g., queen or king size).

Sleeping on one's stomach on conventional mattresses no matter the head position, puts large amounts of stress/strain on our neck, head, jaw, shoulders, mid back, and surrounding soft tissues (e.g., muscles, tendons, ligaments, fascia). It can even have negative effects on vessels and nerves. All these effects are amplified after neck injury.

The need exists for bed systems and methods configured to accommodate users who prefer to, or must, sleep face down.

SUMMARY

The present invention may be embodied as a bed system for supporting at least one user in a face down orientation, the bed system comprising a mattress system and a base system. The mattress system defines at least one sleeping surface and at least one opening. The base system is configured to support the mattress system such that a fresh air space is formed under the opening. The mattress system is configured to support the at least one user in the face down orientation with at least a portion of the at least one user being arranged within the at least one opening.

The present invention may also be embodied as a method of supporting at least one user in a face down orientation, the method comprising the following steps. A mattress system defining at least one sleeping surface and at least one opening is provided. A base system is arranged to support the mattress system such that a fresh air space is formed under the opening such that the at least one user may be supported in the face down orientation with at least a portion of the at least one user being arranged within the at least one opening.

DETAILED DESCRIPTION

Figure 1:
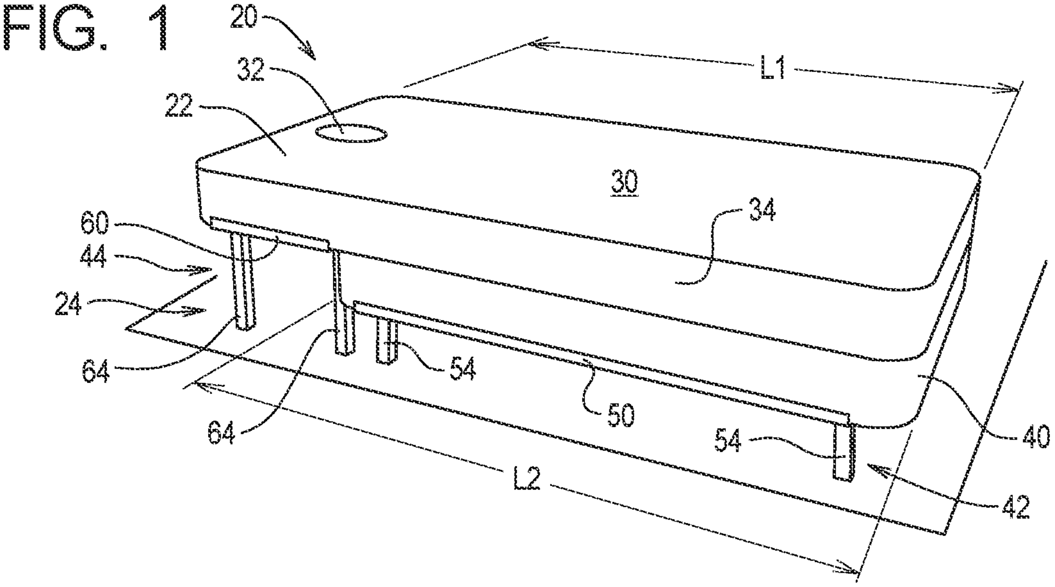
FIG. 1 is a top perspective view of a first example bed system of the present invention.
Figure 2:
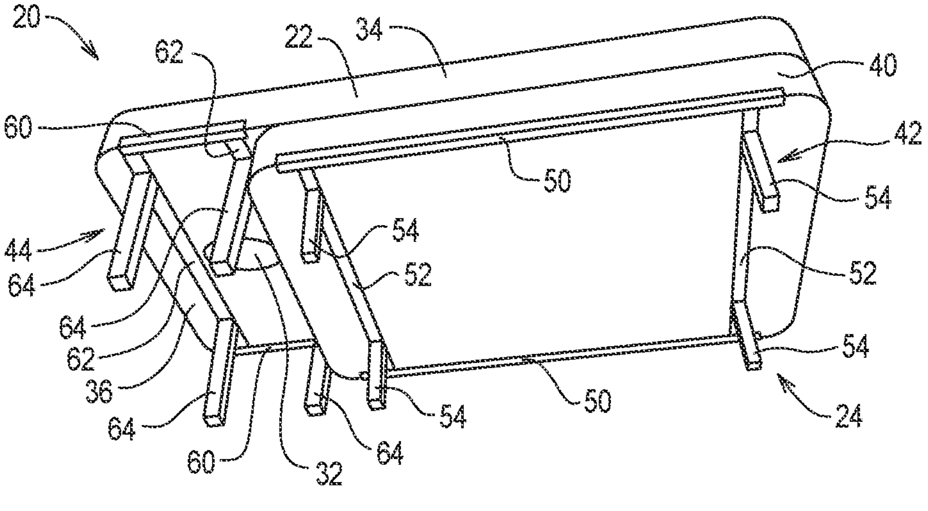
FIG. 2 is a bottom perspective view of the first example bed system.

The present invention may be embodied in a number of different forms, and several embodiments of the invention, with variations of each of these embodiments, will be described below. In the following discussion, the term “horizontal” will be used to refer to a plane parallel to true horizontal, the term “vertical” will be used to refer to a plane parallel to true vertical, and the term “lateral” will be used to refer to a direction orthogonal to both horizontal and vertical planes and in a direction orthogonal to a longitudinal axis of any example bed system or example mattress described herein.

Referring initially to FIGS. 1-4 of the drawing, depicted at 20 therein is a first example bed system 20 constructed in accordance with, and embodying, the principles of the present invention. The first example bed system 20 comprises a mattress 22 and a base system 24.

The example mattress 22 defines a sleeping surface 30, an opening 32, a perimeter surface 34, and a bottom surface 36. The example opening 32 extends from the sleeping surface 30 to the bottom surface 36. In all other respects, the structure of the example mattress 22 is or may be conventional (e.g., case and filler material) and will not be described in further detail.

The example base system 24 comprises a support box 40, a primary frame assembly 42, and a secondary frame assembly 44. The example primary frame assembly 42 comprises at least two primary longitudinal frame rails 50, at least two primary lateral frame rails 52, and at least four primary frame legs 54. The example secondary frame assembly 44 comprises at least two secondary longitudinal frame rails 60, at least two secondary lateral frame rails 62, and at least four secondary frame legs 64.

Figure 3:
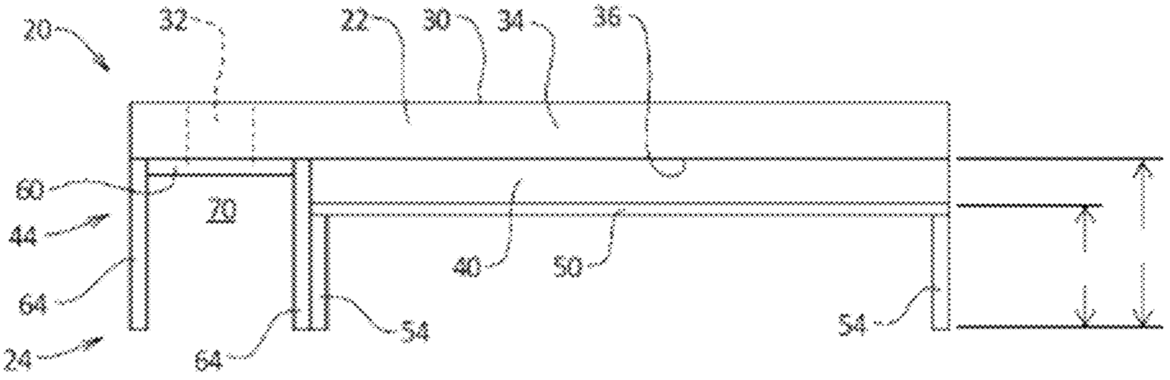
FIG. 3 is a side elevation view of the first example bed system of the present invention.
Figure 4:
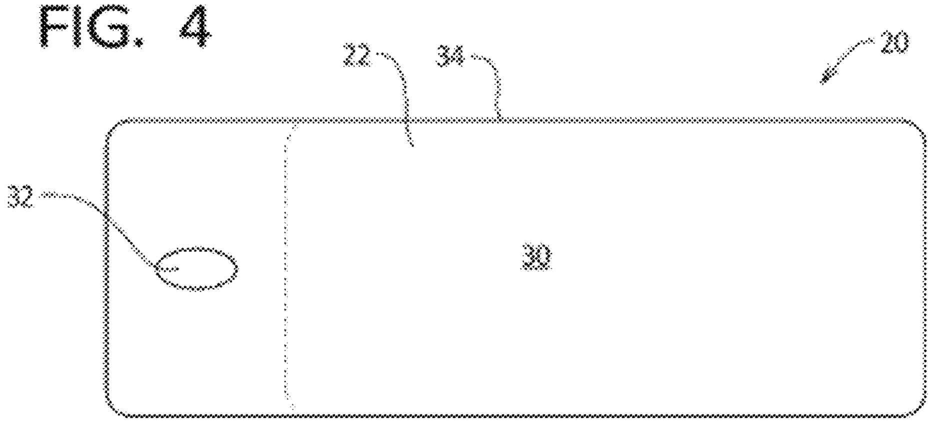
FIG. 4 is a top plan view of the first example bed system of the present invention.

FIG. 1 illustrates that a length L1 of the example mattress 22 is greater than a length L2 of the example support box 40. In the first example bed system 20, the example base system 24 is conventional and the example mattress 22 is elongated with respect to conventional to allow the use of a conventional base system 24. FIG. 3 illustrates that the example secondary frame assembly 44 is sized and dimensioned such that the example primary longitudinal frame rails 50 and primary lateral frame rails 52 are at a primary vertical height H1 and the example secondary longitudinal frame rails 60 and secondary lateral frame rails 62 are at a secondary vertical height H2. The secondary vertical height H2 is above the primary vertical height H1, and a difference D between the primary vertical height H1 and the secondary vertical height H2 is approximately the same as a vertical thickness of the example support box 40. The example base system 24 is thus configured such that entry of air into the opening 32 at the bottom surface 36 of the mattress 22 is substantially unobstructed.

An opening created in the example mattress 22 (or an auxiliary mattress/base combined with a conventional mattress) will allow the user to sleep on their stomach with their face down, creating proper neutral positioning for head, neck, and surrounding structures. The example bed system 20 will help not only people who have neck injuries who want to stomach sleep, but also those who stomach sleep as a habit. For unencumbered breathing, the mattress opening 32 communicates with a fresh air space 70 below the example mattress 22. The fresh air space may be formed by lengthening the mattress 22 relative to the example support box 40 as shown in FIG. 1, by forming a corresponding opening in the support box 40 below the mattress 22, or by providing a base box capable of dropping away as described in further detail below.

Figure 5:
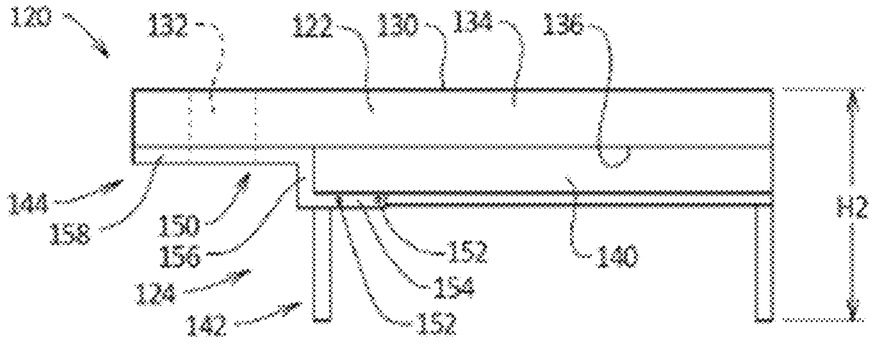
FIG. 5 is a side elevation view of a second example bed system of the present invention.

Referring now to FIG. 5 of the drawing, depicted therein is a second example bed system 120 of the present inventio. The second example bed system 120 comprises a mattress 122 and a base system 124.

The example mattress 122 defines a sleeping surface 130, an opening 132, a perimeter surface 134, and a bottom surface 136. The example opening 132 extends from the sleeping surface 130 to the bottom surface 136. In all other respects, the structure of the example mattress 122 is or may be conventional (e.g., case and filler material) and will not be described in further detail.

The example base system 124 comprises a support box 140, a primary frame assembly 142, and a secondary frame assembly 144. The example primary frame assembly 142 is or may be the same as the example primary frame assembly 42 described above and will not be described again in detail. The example secondary frame assembly 144 comprises at least two secondary rail members 150 and one or more connecting assemblies 152. Each of the secondary rail members 150 comprises a connecting portion 154, an extension portion 156, and a support portion 158. Only one of the example secondary rail members 150 is visible in FIG. 5. At least one secondary lateral frame rail (not visible in FIG. 5) like the secondary lateral frame rails 62 described above may be arranged to extend between the support portions 158 of the secondary rail members 150.

The example connecting assemblies 152 are nuts and bolts arranged to rigidly connect the connecting portions 154 to the primary frame assembly 142. The example extension portions 156 extend from the connecting portions 154 such that the example support portions 158 are supported at the secondary vertical height H2. The support portions 158 and the lateral frame rail(s) (not visible) support a portion of the example mattress 122 such that a bottom of the opening 132 is unobstructed. The second example bed system 120 may be used in substantially the same manner as the other example bed systems described herein.

Figure 6:
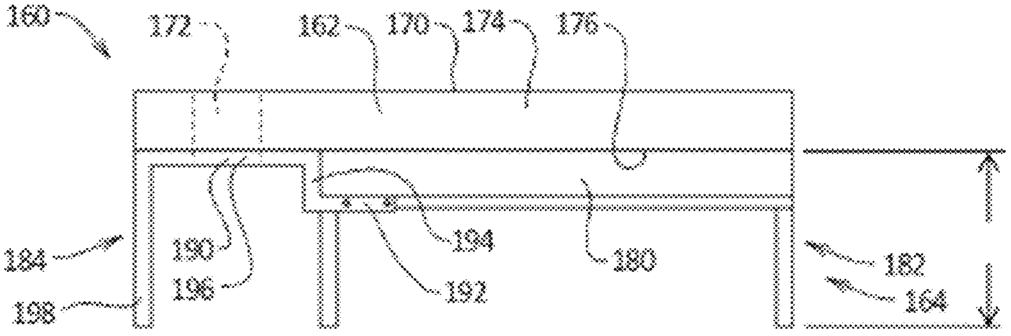
FIG. 6 is a side elevation view of a third example bed system of the present invention.

Referring now to FIG. 6 of the drawing, depicted therein is a third example bed system 160 of the present invention. The second example bed system 160 comprises a mattress 162 and a base system 164.

The example mattress 162 defines a sleeping surface 170, an opening 172, a perimeter surface 174, and a bottom surface 176. The example opening 172 extends from the sleeping surface 170 to the bottom surface 176. In all other respects, the structure of the example mattress 162 is or may be conventional (e.g., case and filler material) and will not be described in further detail.

The example base system 164 comprises a support box 180, a primary frame assembly 182, and a secondary frame assembly 184. The example primary frame assembly 182 is or may be the same as the example primary frame assembly 42 described above and will not be described again in detail. The example secondary frame assembly 184 comprises at least two secondary rail members 190 and one or more connecting assemblies like the connecting assemblies 152 described above. Each of the secondary rail members 190 comprises a connecting portion 192, an extension portion 194, a support portion 196, and a leg portion 198. Only one of the example secondary rail members 190 is visible in FIG. 6. At least one secondary lateral frame rail (not visible in FIG. 6) like the secondary lateral frame rails 62 described above may be arranged to extend between the support portions 198 of the secondary rail members 190.

The example connecting assemblies secure the connecting portions 192 to the primary frame assembly 182. The example extension portions 194 extend from the connecting portions 192 such that the example support portions 196 are supported at the secondary vertical height H2. The leg portion(s) 198 are sized and dimensioned to provide additional support to the support portions 196. The support portions 196 and the lateral frame rail(s) (not visible) support a portion of the example mattress 162 such that a bottom of the opening 172 is unobstructed. The third example bed system 160 may be used in substantially the same manner as the other example bed systems described herein.

Figure 7:
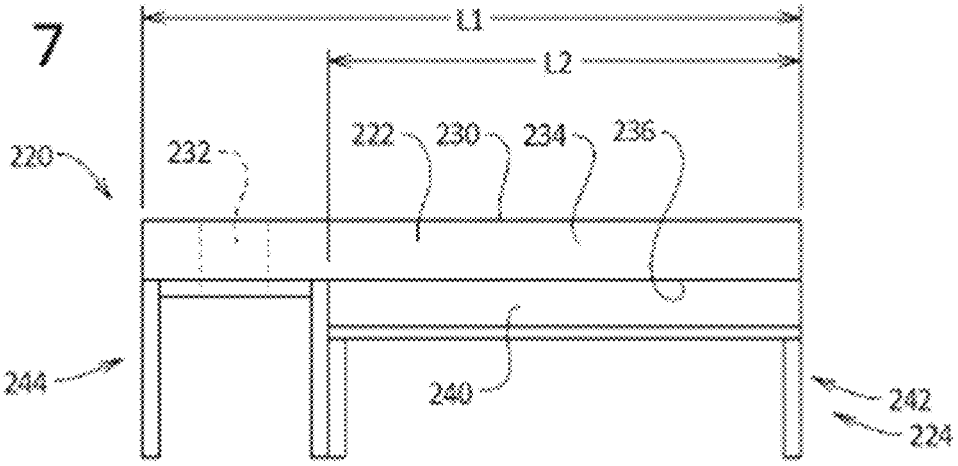
FIG. 7 is a side elevation view of a fourth example bed system of the present invention.
Figure 8:
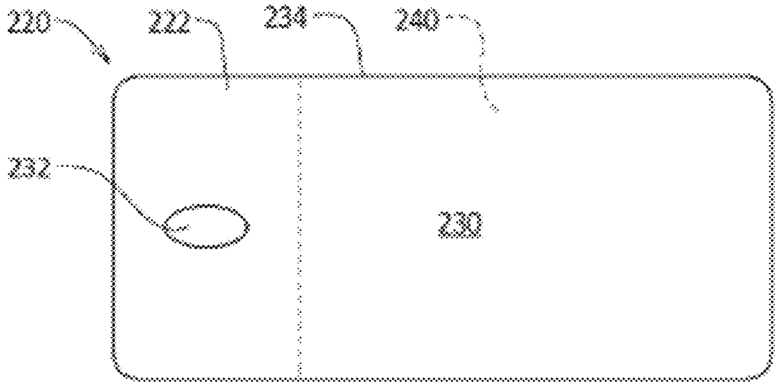
FIG. 8 is a top plan view of the fourth example bed system.

Referring now to FIGS. 7 and 8 of the drawing, depicted at 220 therein is a fourth example bed system 220 constructed in accordance with, and embodying, the principles of the present invention. The fourth example bed system 220 comprises a mattress 222 and a base system 224.

The example mattress 222 defines a sleeping surface 230, an opening 232, a perimeter surface 234, and a bottom surface 236. The example opening 232 extends from the sleeping surface 230 to the bottom surface 236. In all other respects, the structure of the example mattress 222 is or may be conventional (e.g., case and filler material) and will not be described in further detail.

The example base system 224 comprises a support box 240, a primary frame assembly 242, and a secondary frame assembly 244. The example primary frame assembly 242 and example secondary frame assembly 244 may be constructed in substantially the same manner as the example primary frame assembly 42 and example secondary frame assembly 44 described above and thus will not be described herein again in detail.

FIGS. 7 and 8 illustrate that a length L1 of the example mattress 222 is greater than a length L2 of the example support box 240. However, in the fourth example bed system 220, the example base system 224 is shortened with respect to conventional to allow the mattress 222 to be of conventional size (e.g., length and/or width). The fourth example bed system 220 is otherwise constructed and may be used in substantially the same manner as the other example bed systems described herein.

Figure 9:
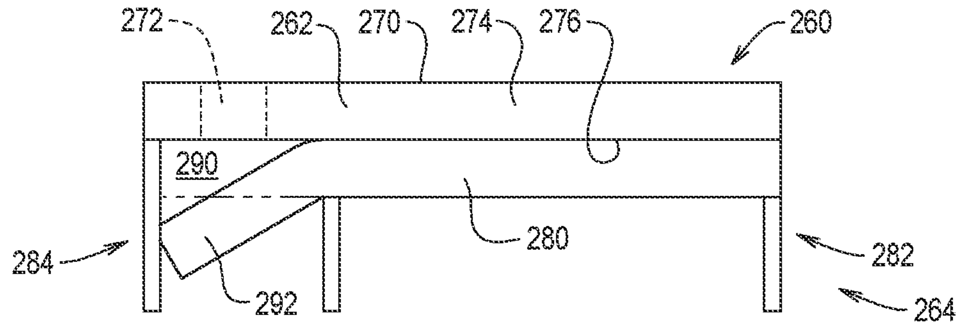
FIG. 9 is a side elevation view of a fifth example bed system of the present invention.

Referring now to FIG. 9 of the drawing, depicted at 260 therein is a fifth example bed system 260 constructed in accordance with, and embodying, the principles of the present invention. The fifth example bed system 260 comprises a mattress 262 and a base system 264.

The example mattress 262 defines a sleeping surface 270, an opening 272, a perimeter surface 274, and a bottom surface 276. The example opening 272 extends from the sleeping surface 270 to the bottom surface 276. In all other respects, the structure of the example mattress 262 is or may be conventional (e.g., case and filler material) and will not be described in further detail.

The example base system 264 comprises a support box 280, a primary frame assembly 282, and a secondary frame assembly 284. The example primary frame assembly 282 and example secondary frame assembly 284 may be constructed in substantially the same manner as the example primary frame assembly 242 and example secondary frame assembly 244 of the fourth example bed system 220 described above and thus will not be described herein again in detail. The example support box 280 is, however, substantially the same length as the example mattress 262.

FIG. 9 illustrates that the example base system 264 is modified to allow the example support box 280 to be bent or otherwise modified or deformed to create a space 290 between bottom surface 276 of the mattress 262 and the support box 280. In particular, a portion 292 of the example support box 280 is unsupported by either the primary frame assembly 282 or the secondary frame assembly 284 such that the unsupported portion 292 is below the mattress 262 to define the space 290. The space 290 allows the air flow between the mattress 262 and the support box 280 such that air is not prevented from reaching the opening 272. The fifth example bed system 260 is otherwise constructed and may be used in substantially the same manner as the other example bed systems described herein.

Figure 10:
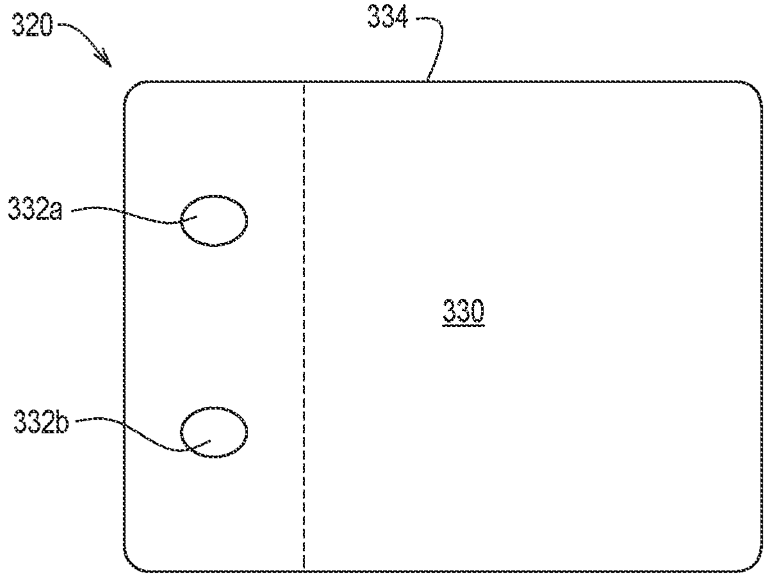
FIG. 10 is a top plan view illustrating a variation of the mattress used by any of the first through fifth example bed systems.

FIG. 10 illustrates a second example mattress 320 that may be used as part of any of the example bed systems 20, 120, 160, 220, or 260 described herein. The second example mattress 320 as constructed is larger (e.g., queen or king) than the first example mattresses 22, 122, 162, 222, and 262 (e.g., single, double, full). Accordingly, the example mattress 320 defines a sleeping surface 330, first and second openings **332*a* and 332*b*, a perimeter surface 334, and a bottom surface (not visible in FIG. 10). Like the openings 32, 132, 172, 232, and 272 described above, the first and second openings 332*a* and 332*b* both extend from sleeping surface 330 to the bottom surface of the mattress 320. Any of the base systems 24, 124, 164, 224, or 264 described above, when properly sized, can be used to support the second example mattress 320. The second example mattress 320** is otherwise constructed and may be used in substantially the same manner as the other example mattresses described herein.

Figure 11:
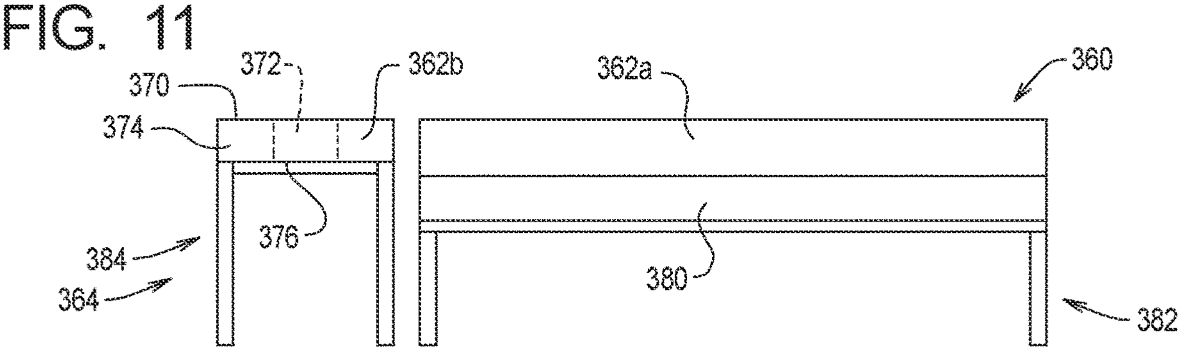
FIG. 11 is a first side elevation view of a sixth example bed system of the present invention.
Figure 12:
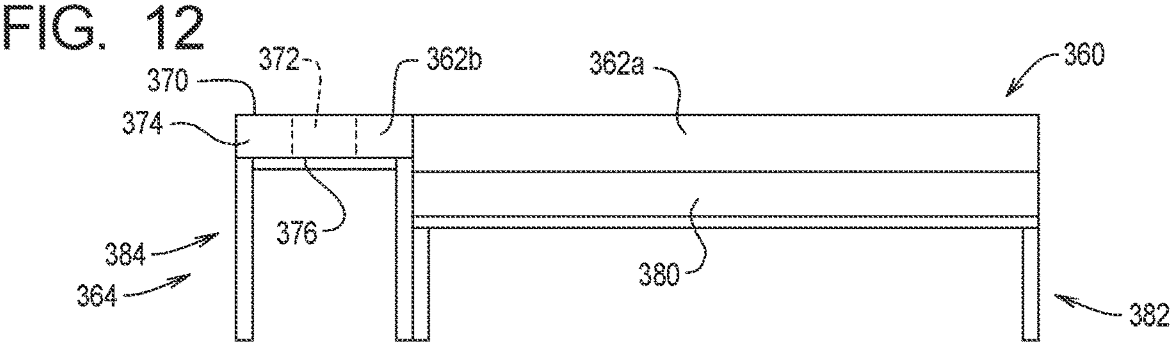
FIG. 12 is a second side elevation view of the sixth example bed system of the present invention.

Turning now to FIGS. 11 and 12 of the drawing, depicted therein is a sixth example bed system 360 constructed in accordance with, and embodying, the principles of the present invention. The sixth example bed system 360 comprises a primary mattress **362*a*, a secondary mattress 362*b*, and a base system 364. The example primary mattress 362*a* is or may be conventional and will not be described herein in detail. The example secondary mattress 362*b* defines a sleeping surface 370, an opening 372, a perimeter surface 374, and a bottom surface 376. The example base system 364 defines a support box 380, a primary frame assembly 382, and a secondary frame assembly 384. The example base box 380 and the primary frame assembly 382** are or may be conventional and will not be described herein in detail.

The example secondary frame assembly 384 is or may be constructed in the same manner as the example secondary frame assemblies 44, 144, 184, 244, or 284 described herein. However, instead of two frame assemblies each supporting a portion of a single mattress, the example primary frame assembly 382 supports the support box 380 and the primary mattress **362*a* and the example secondary frame assembly 384 is adapted to support only the secondary mattress 362*b***.

The sixth example bed system 360 may thus be formed by adding the secondary mattress **362*b* and secondary frame assembly 384 to a conventional mattress such as the primary mattress 362*a* supported by a conventional support box 380 and conventional primary frame assembly 382. The sixth example may thus be used without the secondary mattress 362*b* as a conventional bed as shown in FIG. 11 or with the secondary mattress 362***b* combined with a conventional bed to facilitate face down sleeping as shown in FIG. 12. The sixth example bed system 360 is otherwise constructed and may be used in substantially the same manner as the other example bed systems described herein.

Figure 13:
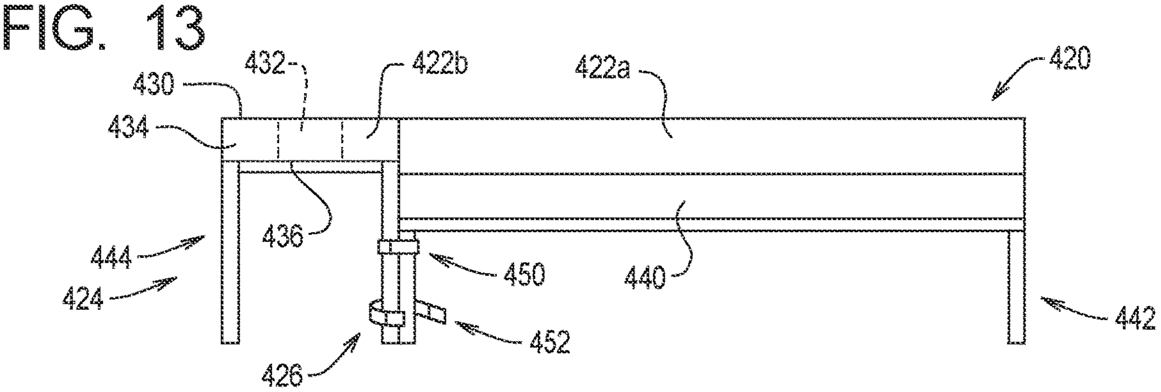
FIG. 13 is a side elevation view of a seventh example bed system of the present invention.

Turning now to FIG. 13 of the drawing, depicted therein is a seventh example bed system 420 constructed in accordance with, and embodying, the principles of the present invention. Like the sixth example bed system 360, the seventh example bed system 420 comprises a primary mattress 422*a*, a secondary mattress 422*b*, and a base system 424, but the seventh example bed system 420 further comprises an attachment system 426. The example primary mattress 422*a* is or may be conventional and will not be described herein in detail. The example secondary mattress 422*b* defines a sleeping surface 430, an opening 432, a perimeter surface 434, and a bottom surface 436.

The example base system 424 comprises a support box 440, a primary frame assembly 442, and a secondary frame assembly 444. The example attachment system 426 is arranged to secure the secondary frame assembly 444 to the primary frame assembly 442 and comprises first and second connecting assemblies 450 and 452. The example connecting assemblies 450 and 452 are depicted as straps, but bolts, screws, or other connecting systems may be used to form the connecting assemblies 450 and 452 and/or the attachment system 426. The seventh example bed system 420 is otherwise constructed and may be used in substantially the same manner as the other example bed systems described herein.

Figure 14:
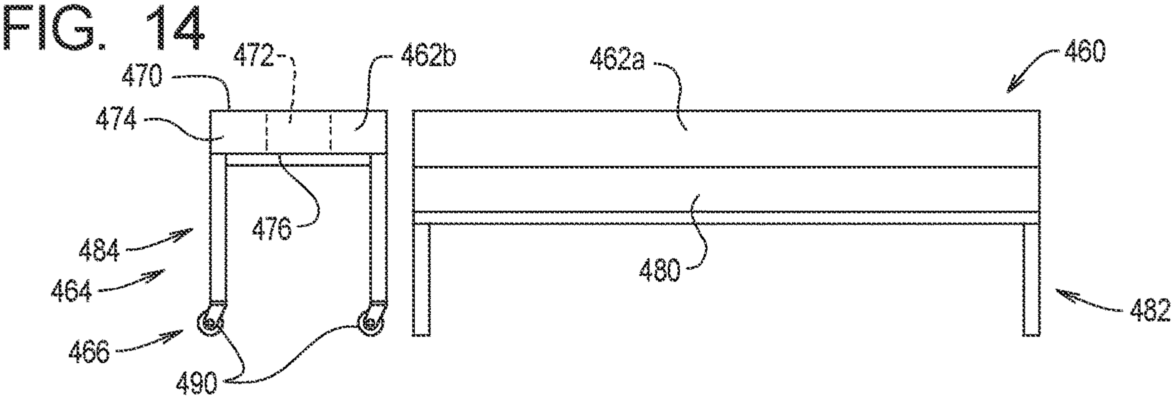
FIG. 14 is a side elevation view of an eighth example bed system of the present invention.

Turning now to FIG. 14 of the drawing, depicted therein is an eighth example bed system 460 constructed in accordance with, and embodying, the principles of the present invention. Like the sixth example bed system 360, the seventh example bed system 460 comprises a primary mattress 462*a*, a secondary mattress 462*b*, and a base system 464, but the eighth example bed system 460 further comprises a wheel system 466. The example primary mattress 462*a* is or may be conventional and will not be described herein in detail. The example secondary mattress 462*b* defines a sleeping surface 470, an opening 472, a perimeter surface 474, and a bottom surface 476.

The example base system 464 comprises a support box 480, a primary frame assembly 482, and a secondary frame assembly 484. The example attachment system 466 is arranged to secure the secondary frame assembly 484 to the primary frame assembly 482 and comprises first and second wheel assemblies 490. The example wheel assemblies 490 are secured to legs of the secondary frame assembly 484 to facilitate movement of the secondary frame assembly 484 and the secondary mattress 462*b* supported thereby. An attachment system like the example attachment system 426 described above may additionally be used to inhibit inadvertent movement of the secondary mattress 362*b* relative to the primary mattress 362*a*. The eighth example bed system 460 is otherwise constructed and may be used in substantially the same manner as the other example bed systems described herein.

Figure 15:
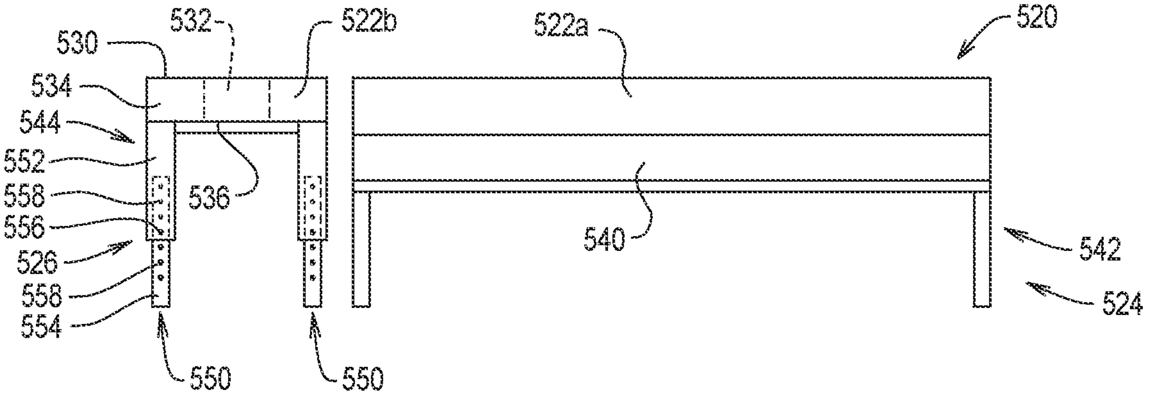
FIG. 15 is a side elevation view of a ninth example bed system of the present invention.

Turning now to FIG. 15 of the drawing, depicted therein is a ninth example bed system 520 constructed in accordance with, and embodying, the principles of the present invention. Like the sixth example bed system 360, the ninth example bed system 520 comprises a primary mattress 522*a*, a secondary mattress 522*b*, and a base system 524, but the base system 524 of the ninth example bed system 520 further comprises a height adjustment system 526. The example primary mattress 522*a* is or may be conventional and will not be described herein in detail. The example secondary mattress 522*b* defines a sleeping surface 530, an opening 532, a perimeter surface 534, and a bottom surface 536.

The example base system 524 comprises a support box 540, a primary frame assembly 542, and a secondary frame assembly 544. The example height adjustment system 526 is arranged to adjust an effective height of the secondary frame assembly 544 such that the sleeping surface 530 of the secondary mattress 522*b* is at a desired height level relative to a sleeping surfaced defined by the primary mattress 522*a*. In FIG. 15, the height level of the sleeping surface 530 of the secondary mattress 522*b* the same as the height level of the sleeping surfaced defined by the primary mattress 522*a*. The example height adjustment system 526 takes the form of adjustable leg assemblies 550 of the secondary frame assembly 544. In particular, each leg assembly 550 comprises a fixed leg portion 552, a movable leg portion 554, and a lock member 556. The lock member 556 takes the form of a pin that extends through aligned openings 558 formed in the fixed and movable leg portions 552 and 554, but other height adjustment systems may be used in place of the example pins 556 and holes 558. The ninth example bed system 520 is otherwise constructed and may be used in substantially the same manner as the other example bed systems described herein.

Figure 16:
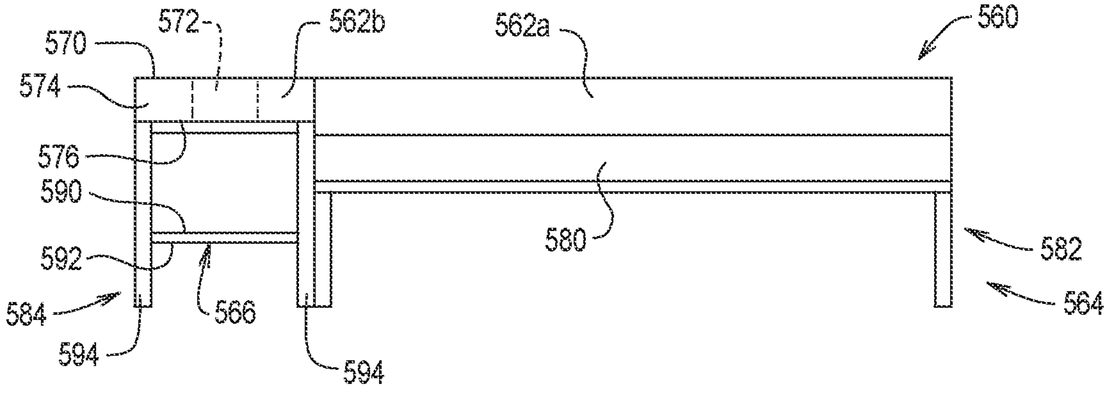
FIG. 16 is a side elevation view of a tenth example bed system of the present invention.

Turning now to FIG. 16 of the drawing, depicted therein is a tenth example bed system 560 constructed in accordance with, and embodying, the principles of the present invention. Like the sixth example bed system 360, the seventh example bed system 560 comprises a primary mattress 562*a*, a secondary mattress 562*b*, and a base system 564, but the base system 564 of the tenth example bed system 560 further comprises a shelf system 566. The example primary mattress 562*a* is or may be conventional and will not be described herein in detail. The example secondary mattress 562*b* defines a sleeping surface 570, an opening 572, a perimeter surface 574, and a bottom surface 576.

The example base system 564 comprises a support box 580, a primary frame assembly 582, and a secondary frame assembly 584. The example shelf system 566 is arranged to define a shelf surface 590 below the opening 572. The example shelf system 566 takes the form of a generally planar member 592 supported by two or more legs 594 of the secondary frame assembly 584. The tenth example bed system 560 is otherwise constructed and may be used in substantially the same manner as the other example bed systems described herein.

Figure 17:
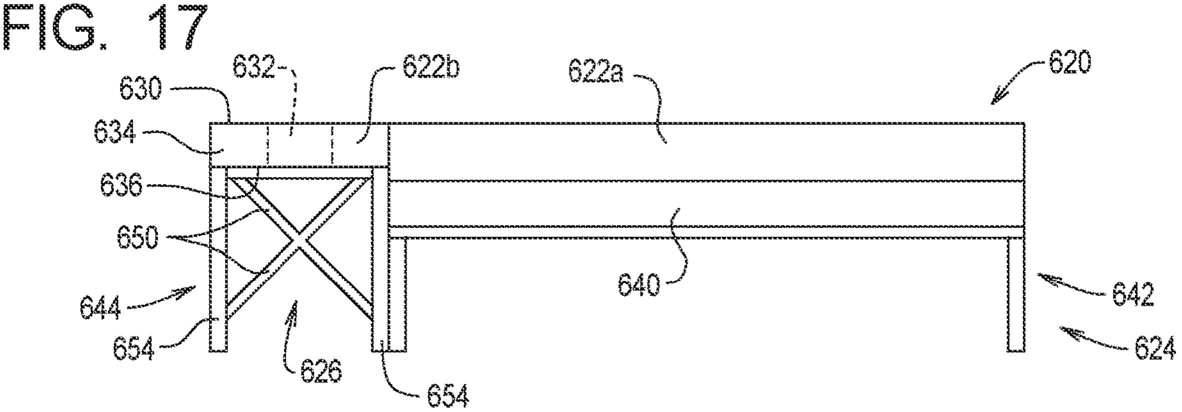
FIG. 17 is a side elevation view of an eleventh example bed system of the present invention.
Figure 18:
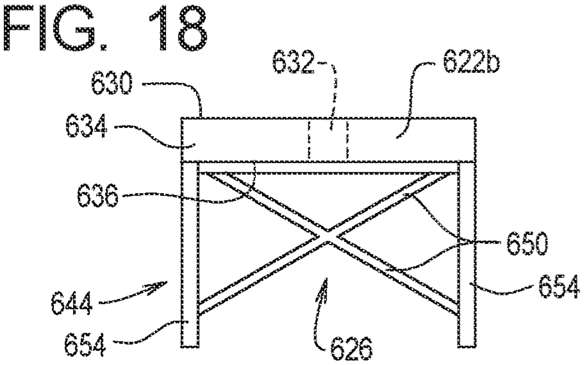
FIG. 18 is an end elevation view of the eleventh example bed system of the present invention.

An eleventh example bed system 620 constructed in accordance with, and embodying, the principles of the present invention is depicted in FIGS. 17 and 18. Like the sixth example bed system 360, the seventh example bed system 620 comprises a primary mattress 622*a*, a secondary mattress 622*b*, and a base system 624, but the base system 624 of the eleventh example bed system 620 further comprises a brace system 626. The example primary mattress 622*a* is or may be conventional and will not be described herein in detail. The example secondary mattress 622*b* defines a sleeping surface 630, an opening 632, a perimeter surface 634, and a bottom surface 636.

The example base system 624 comprises a support box 640, a primary frame assembly 642, and a secondary frame assembly 644. The example brace system 626 comprises at least one or more lateral brace members 650 (FIG. 17) and one or more end brace members 652 (FIG. 18). The brace members 650 and/or 652 extend between pairs of legs 654 defined by the secondary frame assembly 644. The example brace system 626 comprises brace members 650 and 652 in the form of X-braces configured to rigidify and stabilize the secondary frame assembly 644. The eleventh example bed system 620 is otherwise constructed and may be used in substantially the same manner as the other example bed systems described herein.

Figure 19:
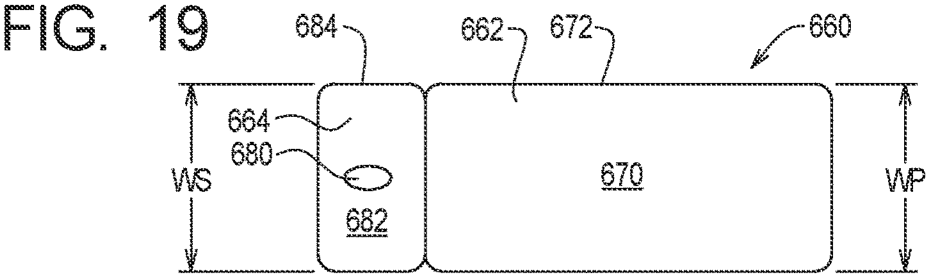
FIG. 19 is a top plan view a first variation of any of the sixth through eleventh example bed systems.

FIG. 19 illustrates a first example mattress system 660 that may be used by any of the sixth through eleventh bed systems described above. The first example mattress system 660 comprises a first example primary mattress 662 and a first example secondary mattress 664. The first example primary mattress 662 defines a primary sleeping surface 670 and a primary perimeter surface 672. The first example secondary mattress 664 defines an opening 680, a secondary sleeping surface 682, and a secondary perimeter surface 684. The primary perimeter surface 672 takes the shape of a rectangle with rounded corners in top plan view. The secondary perimeter surface 684 also takes the shape of a rectangle with rounded corners, but the longitudinal axis of the rectangle defined by the secondary perimeter surface 684 is substantially orthogonal to the longitudinal axis of the rectangle defined by the primary perimeter surface 672. Further, a width dimension WS of the of the secondary perimeter surface 684 in a dimension parallel to the longitudinal axis of the rectangle defined by the secondary perimeter surface 684 is substantially the same as a width dimension WP of the primary perimeter surface orthogonal to the longitudinal axis of the rectangle defined by the primary perimeter surface 672.

Figure 20:
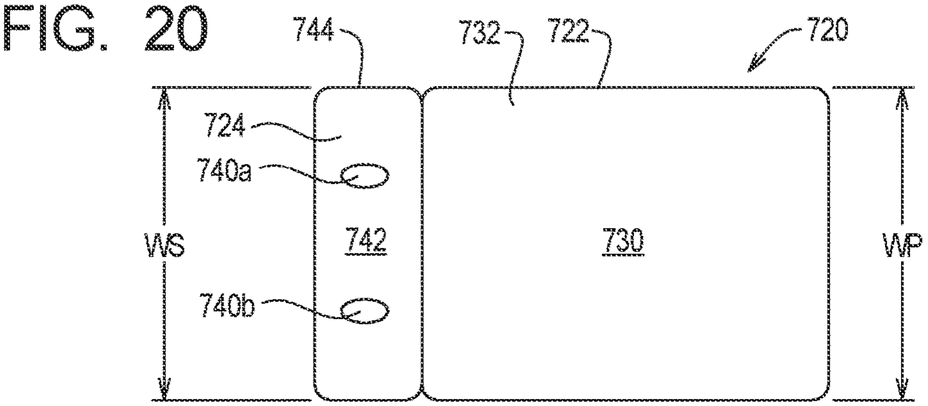
FIG. 20 is a top plan view a second variation of any of the sixth through eleventh example bed systems.

FIG. 20 illustrates a second example mattress system 720 that may be used by any of the sixth through eleventh bed systems described above. The second example mattress system 720 comprises a second example primary mattress 722 and a second example secondary mattress 724. The second example primary mattress 722 defines a primary sleeping surface 730 and a primary perimeter surface 732. The second example secondary mattress 724 defines first and second openings **740*a* and 740*b*, a secondary sleeping surface 742, and a secondary perimeter surface 744. The primary perimeter surface 732 takes the shape of a rectangle with rounded corners in top plan view. The secondary perimeter surface 744 also takes the shape of a rectangle with rounded corners, but the longitudinal axis of the rectangle defined by the secondary perimeter surface 744 is substantially orthogonal to the longitudinal axis of the rectangle defined by the primary perimeter surface 732. Further, a width dimension WS of the of the secondary perimeter surface 744 in a dimension parallel to the longitudinal axis of the rectangle defined by the secondary perimeter surface 744 is substantially the same as a width dimension WP of the primary perimeter surface orthogonal to the longitudinal axis of the rectangle defined by the primary perimeter surface 732**.

Figure 21:
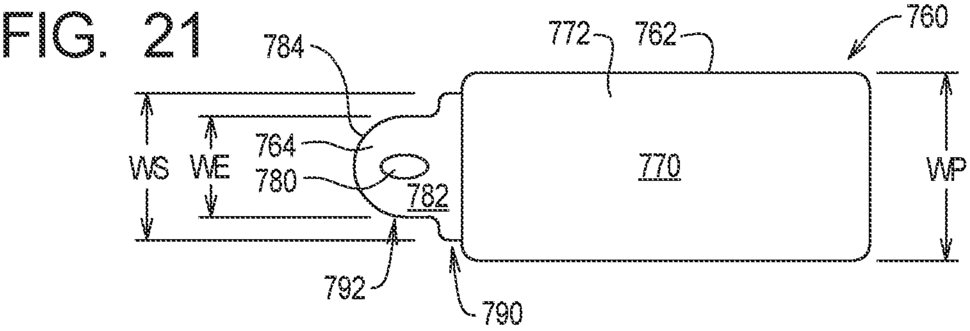
FIG. 21 is a top plan view a third variation of any of the sixth through eleventh example bed systems.

FIG. 21 illustrates a third example mattress system 760 that may be used by any of the sixth through eleventh bed systems described above. The third example mattress system 760 comprises a third example primary mattress 762 and a third example secondary mattress 764. The third example primary mattress 762 defines a primary sleeping surface 770 and a primary perimeter surface 772. The third example secondary mattress 764 defines an opening 780, a secondary sleeping surface 782, and a secondary perimeter surface 784. The primary perimeter surface 772 takes the shape of a rectangle with rounded corners in top plan view. The secondary perimeter surface 784 defines a generally rectangular base portion 790 and a rounded extension portion 792 extending from the base portion 790 in a direction opposite the primary mattress 762. The longitudinal axis of the rectangle defined by the base portion 790 is substantially orthogonal to the longitudinal axis of the rectangle defined by the primary perimeter surface 772. In the third example mattress system, a width dimension WS of the of the secondary perimeter surface 784 in a dimension parallel to the longitudinal axis of the rectangle defined by the secondary perimeter surface 784 is slightly shorter than a width dimension WP of the primary perimeter surface 772 orthogonal to the longitudinal axis of the rectangle defined by the primary perimeter surface 772. A width dimension WE of the extension portion 792 is smaller than the width dimension WS.

Figure 22:
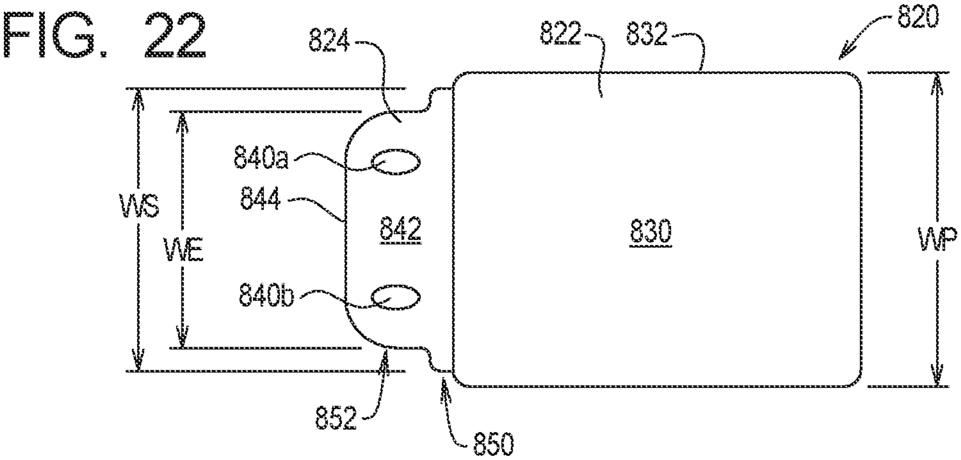
FIG. 22 is a top plan view a fourth variation of any of the sixth through eleventh example bed systems.

FIG. 22 illustrates a fourth example mattress system 820 that may be used by any of the sixth through eleventh bed systems described above. The fourth example mattress system 820 comprises a fourth example primary mattress 822 and a fourth example secondary mattress 824. The fourth example primary mattress 822 defines a primary sleeping surface 830 and a primary perimeter surface 832. The fourth example secondary mattress 824 defines first and second openings **840*a* and 840*b*, a secondary sleeping surface 842, and a secondary perimeter surface 844. The primary perimeter surface 832 takes the shape of a rectangle with rounded corners in top plan view. The secondary perimeter surface 844 defines a generally rectangular base portion 850 and an extension portion 852 with rounded corners extending from the base portion 850 in a direction opposite the primary mattress 822. The longitudinal axis of the rectangle defined by the base portion 850 is substantially orthogonal to the longitudinal axis of the rectangle defined by the primary perimeter surface 832. In the fourth example mattress system, a width dimension WS of the of the secondary perimeter surface 844 in a dimension parallel to the longitudinal axis of the rectangle defined by the secondary perimeter surface 844 is slightly shorter than a width dimension WP of the primary perimeter surface 832 orthogonal to the longitudinal axis of the rectangle defined by the primary perimeter surface 832. A width dimension WE of the extension portion 852** is smaller than the width dimension WS.

Figure 23:
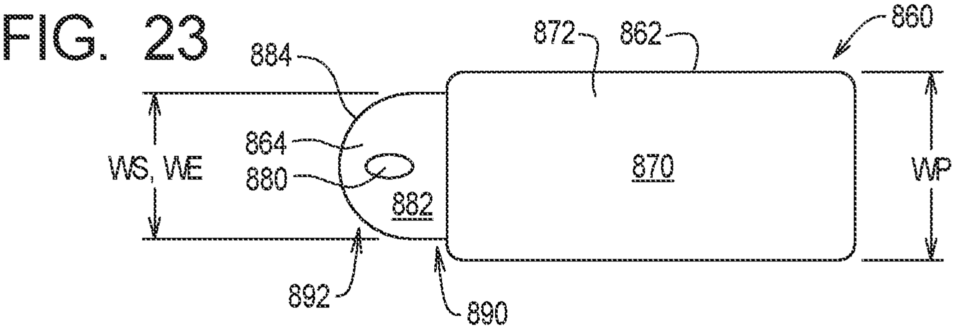
FIG. 23 is a top plan view a fifth variation of any of the sixth through eleventh example bed systems.

FIG. 23 illustrates a fifth example mattress system 860 that may be used by any of the sixth through eleventh bed systems described above. The fifth example mattress system 860 comprises a fifth example primary mattress 862 and a fifth example secondary mattress 864. The fifth example primary mattress 862 defines a primary sleeping surface 870 and a primary perimeter surface 872. The fifth example secondary mattress 864 defines an opening 880, a secondary sleeping surface 882, and a secondary perimeter surface 884. The primary perimeter surface 872 takes the shape of a rectangle with rounded corners in top plan view. The secondary perimeter surface 884 defines a generally rectangular base portion 890 and a rounded extension portion 892 extending from the base portion 890 in a direction opposite the primary mattress 862. The longitudinal axis of the rectangle defined by the base portion 890 is substantially orthogonal to the longitudinal axis of the rectangle defined by the primary perimeter surface 872. In the fifth example mattress system, a width dimension WS of the of the secondary perimeter surface 884 in a dimension parallel to the longitudinal axis of the rectangle defined by the secondary perimeter surface 884 is slightly shorter than a width dimension WP of the primary perimeter surface orthogonal to the longitudinal axis of the rectangle defined by the primary perimeter surface 872. A width dimension WE of the extension portion 892 is substantially the same as the width dimension WS.

Figure 24:
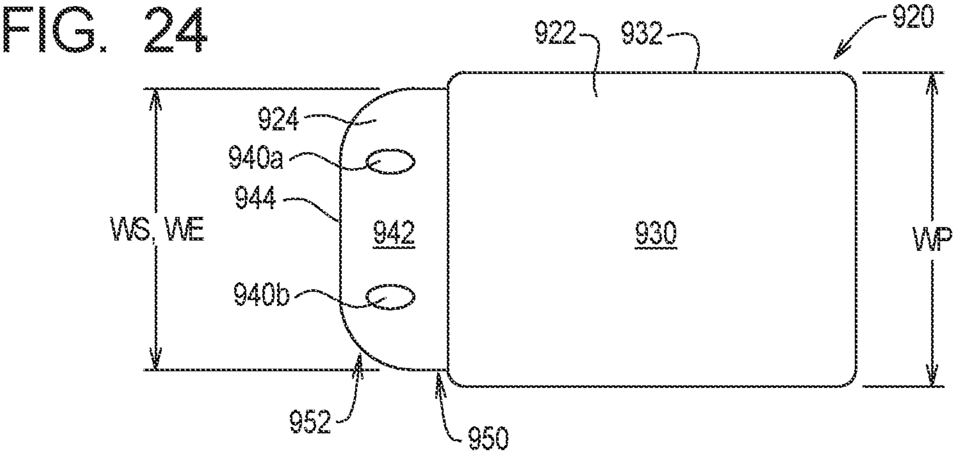
FIG. 24 is a top plan view a sixth variation of any of the sixth through eleventh example bed systems.

FIG. 24 illustrates a sixth example mattress system 920 that may be used by any of the sixth through eleventh bed systems described above. The sixth example mattress system 920 comprises a sixth example primary mattress 922 and a sixth example secondary mattress 924. The sixth example primary mattress 922 defines a primary sleeping surface 930 and a primary perimeter surface 932. The sixth example secondary mattress 924 defines first and second openings 940*a* and 940*b*, a secondary sleeping surface 942, and a secondary perimeter surface 944. The primary perimeter surface 944 takes the shape of a rectangle with rounded corners in top plan view. The secondary perimeter surface 944 defines a generally rectangular base portion 950 and an extension portion 952 with rounded corners extending from the base portion 950 in a direction opposite the primary mattress 922. The longitudinal axis of the rectangle defined by the base portion 950 is substantially orthogonal to the longitudinal axis of the rectangle defined by the primary perimeter surface 932. In the sixth example mattress system, a width dimension WS of the of the secondary perimeter surface 944 in a dimension parallel to the longitudinal axis of the rectangle defined by the secondary perimeter surface 944 is slightly shorter than a width dimension WP of the primary perimeter surface 932 orthogonal to the longitudinal axis of the rectangle defined by the primary perimeter surface 932. A width dimension WE of the extension portion 952 is substantially the same as the width dimension WS.

Figure 25:
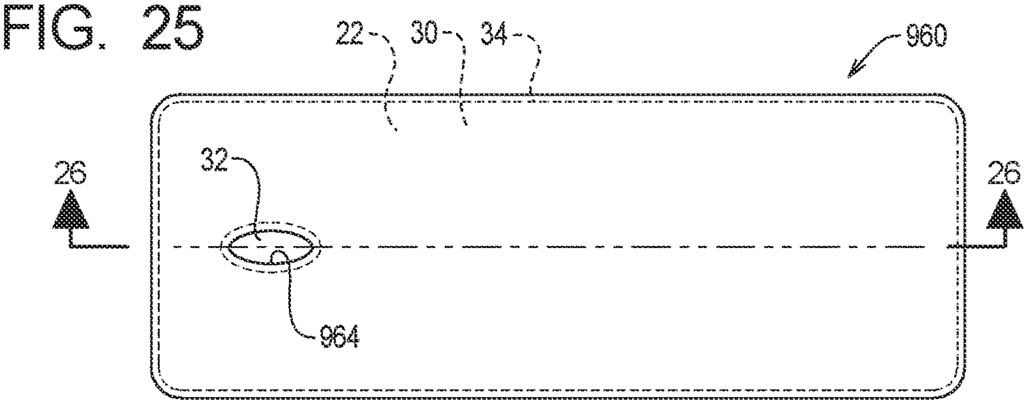
FIG. 25 is a top plan view of a twelfth example bed system.
Figure 26:
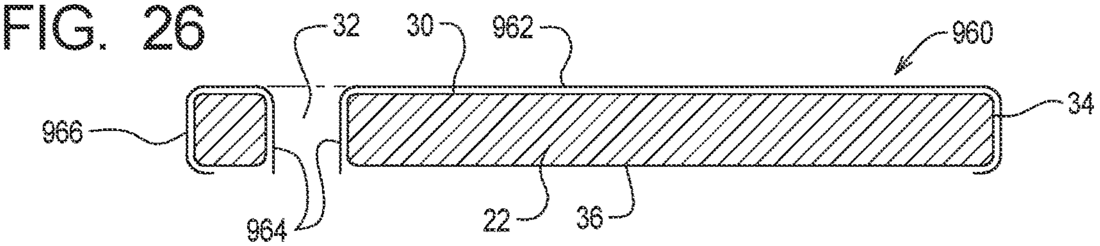
FIG. 26 is a section view along lines 26-26 in FIG. 25.

FIGS. 25 and 26 illustrate a cover member 960 that may be used by a mattress such as the mattress 22 of the first example bed system 20 described above. The cover member 960 comprises a main portion 962, an opening portion 964, and a perimeter portion 966. The main portion 962 is adapted to cover the sleeping surface 30 of the mattress of the first example bed system 20. The opening portion 964 is sized, dimensioned, and arranged in the main portion 962 to extend into the opening 32 of the first example mattress 22. The perimeter portion 966 is configured to extend along at least a portion of the perimeter surface 34 of the mattress 22. The cover system 960 may be a bed sheet made of conventional bed sheet materials or a mattress cover made of conventional mattress cover materials. In addition, two of the cover members 960 may be used: a first as a mattress cover, and a second as a sheet between the mattress cover and the user of the mattress 22. Finally, the cover member 960 may be "flat" or "fitted". A fitted cover member 960 may further comprise elastic or other resiliently deformable material arranged to extend at least partly along the bottom surface 36 defined by the first example bed system 20 to secure the cover member 960 in place relative to the mattress.

Figure 27:
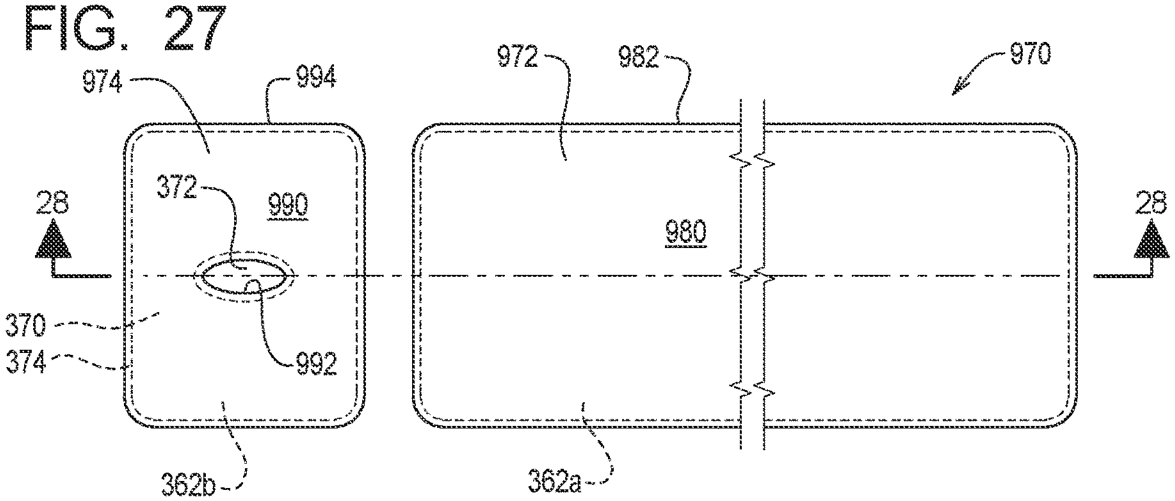
FIG. 27 is a top plan view of a thirteenth example bed system.
Figure 28:
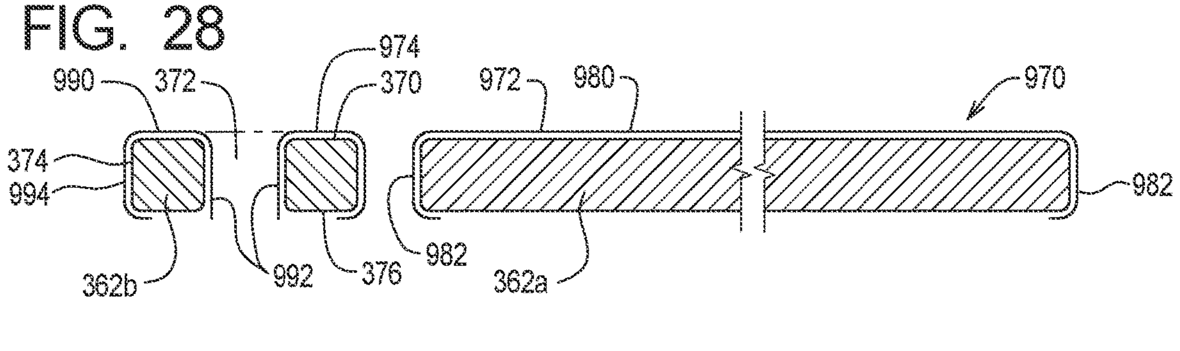
FIG. 28 is a section view along lines 28-28 in FIG. 27.

FIGS. 27 and 28 illustrate an example cover system 970 comprising a primary cover member 972 and a secondary cover member 974. The example cover system 970 may be used by the mattresses 362*a* and 362*b* of the sixth example bed system 360 described above. The primary cover member 972 is or may be conventional and comprises a primary main portion 980 and a primary perimeter portion 982. The secondary cover member 974 comprises a secondary main portion 990, an opening portion 992, and a secondary perimeter portion 994. The secondary cover member adapted to cover the sleeping surface 370 of the secondary mattress 362*b* of the sixth example bed system 360. The opening portion 992 is sized, dimensioned, and arranged in the secondary main portion 990 to extend into the opening 372 of the secondary mattress 362*b* of the sixth example bed system 360. The perimeter portion 994 is configured to extend along at least a portion of the perimeter surface 374 of the secondary mattress 362*b*. The cover members 972 and 974 may be bed sheets made of conventional bed sheet materials or mattress covers made of conventional mattress cover materials. In addition, two of the cover members 972 and 974 may be used on each mattress: a first as a mattress cover, and a second as a sheet between the mattress cover and the user. Finally, the cover members 972 and 974 may be "flat" or "fitted". A fitted cover member 972 and/or 974 may further comprise elastic or other resiliently deformable material arranged to extend at least partly along the bottom surface (e.g., bottom surface 376 of the secondary mattress 362*b*) to secure the cover member 974 in place relative to the mattress.

Cover members such as the cover members 960 and 974 may be configured to cover any of the mattresses defining an opening as described herein.

What is claimed is:

1. A bed system for supporting at least one user having a head and a body in a face down orientation, the bed system comprising:

a mattress system comprising a mattress defining
- first and second mattress portions each defining a top mattress surface, a bottom mattress surface, and a perimeter surface, where
- the second mattress portion defines at least one mattress opening wherein the at least one mattress opening is an enclosed channel arranged such that the at least one mattress opening extends from the top mattress surface of the second mattress portion to the bottom mattress surface of the second mattress portion within the second mattress portion; and a base system comprising
- a frame comprising a primary frame assembly and a secondary frame assembly; wherein the primary frame assembly is configured to support the first mattress portion at a primary vertical height; the secondary frame assembly is configured to support the second mattress portion at a secondary vertical height;

the mattress is configured such that, with the first mattress portion supported by the primary frame assembly and the second mattress portion supported by the secondary frame assembly, the second mattress portion extends beyond the first mattress portion, the top mattress surface of the second mattress portion is aligned with the top mattress surface of the first mattress portion and a fresh air space is formed under the at least one mattress opening; and the mattress is configured to support the head and the body of the at least one user such that, when the user is supported in the face down orientation,
- the head of the at least one user is arranged at least partly on the second mattress portion and at least partly within the at least one opening; and
- a substantial portion of the body of the at least one user is supported on the first mattress portion.

2. A bed system as recited in claim 1, in which the base system comprises a support box configured to support the first mattress portion.

3. A bed system as recited in claim 1, in which:

the primary frame assembly comprises at least at least two primary longitudinal rails and at least two primary lateral rails; and the secondary frame assembly comprises at least two secondary longitudinal rails and at least two secondary lateral rails; wherein the at least two primary longitudinal rails extend along the length of the first mattress portion;

the at least two primary lateral rails extend along the width of the first mattress portion;

the at least two secondary longitudinal rails extend along the length of the second mattress portion; and the at least two secondary lateral rails extend along the width of the second mattress portion.

4. A bed system as recited in claim 1, in which:

the base system comprises a support box; wherein the support box supports the first mattress portion;

the primary frame assembly supports the support box and the secondary frame assembly; and the secondary frame assembly supports the second mattress portion, where the at least one opening is formed in the second mattress portion.

5. A bed system as recited in claim 1, in which:

the mattress system comprises a primary mattress and a secondary mattress, where the at least one opening is formed in the secondary mattress; wherein the primary frame assembly supports the primary mattress; and the secondary frame assembly supports the secondary mattress.

6. A bed system as recited in claim 1, in which:

the mattress system comprises a primary mattress and a secondary mattress, where the at least one opening is formed in the secondary mattress; and the base system comprises a support box; wherein the primary frame assembly supports the support box;

the support box supports the primary mattress; and the secondary frame assembly supports the secondary mattress.

7. A bed system as recited in claim 1, in which:

the mattress system defines a first mattress opening and a second mattress opening such that the first and second mattress openings extend between the top and bottom mattress surfaces within the second mattress portion; wherein the mattress system is configured to support a first and second user in the face down orientation with the head of the first user is arranged at least partly on the second mattress portion and at least partly within the first opening and the head of the second user is arranged at least partly on the second mattress portion and at least partly within the second opening.

8. A bed system as recited in claim 1, in which:

the first mattress portion defines a first width;

the second mattress portion defines a second width; wherein the first width is equal to the second width.

9. A bed system as recited in claim 1, in which:

the mattress system comprises first and second mattresses; the first mattress defines the first mattress portion and is adapted to be supported by the primary frame assembly; and the second mattress defines the second mattress portion and is adapted to be supported by the secondary frame assembly.

10. A bed system as recited in claim 1, in which the mattress system comprises a single mattress defining the first and second mattress portions.

11. A method of supporting at least one user having a head and a body in a face down orientation, the method comprising the steps of:

providing a mattress system comprising a mattress, the mattress defining first and second mattress portions each defining a top mattress surface, a bottom mattress surface, and a perimeter surface, where mattress surface, the second mattress portion defines at least one mattress opening wherein the at least one mattress opening is an enclosed channel arranged such that the mattress opening extends from the top mattress surface of the second mattress portion to the bottom mattress surface of the second mattress portion and within the second mattress portion;

providing a base system, the base system comprising a frame comprising a primary frame assembly and a secondary frame assembly;

arranging the primary frame assembly to support the first mattress portion at a primary vertical height;

arranging the secondary frame assembly to support the second mattress portion at a secondary vertical height;

configuring the mattress such that, with the first mattress portion supported by the primary frame assembly and the second mattress portion supported by the secondary frame assembly, the second mattress portion extends beyond the first mattress portion, the top mattress surface of the second mattress portion is aligned with the top mattress surface of the first mattress portion and a fresh air space is formed under the at least one mattress opening; and arranging the mattress such that, when the at least one user is supported on the mattress in the face down orientation, the head of the at least one user is arranged at least partly on the second mattress portion and at least partly within the at least one opening and a substantial portion of the body of the at least one user is supported on the first mattress portion.

12. A method as recited in claim 11, in which:

the step of providing the base system comprises the step of providing a support box; further comprising the steps of arranging the support box to support the first mattress portion;

arranging the primary frame assembly to support the support box and the secondary frame assembly; and arranging the secondary frame assembly to support a second mattress portion, where the at least one opening is formed in the second mattress portion.

13. A method as recited in claim 11, in which:

the step of providing the base system comprises the step of providing a support box;

further comprising the steps of arranging the support box to support the first mattress portion;

arranging the primary frame assembly to support the support box and the secondary frame assembly; and arranging the secondary frame assembly to support the second mattress portion.

14. A method as recited in claim 11, in which:

the step of providing the mattress system comprises the steps of providing a primary mattress and providing a secondary mattress, where the at least one opening is formed in the secondary mattress; further comprising the steps of arranging the primary frame assembly to support the primary mattress; and arranging the secondary frame assembly to support the secondary mattress.

15. A method as recited in claim 11, in which:

the step of providing the mattress system comprises the steps of providing a primary mattress and providing a secondary mattress, where the at least one opening is formed in the secondary mattress; and the step of providing the base system comprises the steps of providing a support box; further comprising the steps of arranging the primary frame assembly to support the support box;

arranging the support box to support the primary mattress; and arranging the secondary frame assembly to support the secondary mattress.

16. A method as recited in claim 11, in which:

the step of providing a mattress system further comprises the steps of defining a first mattress opening and a second mattress opening such that the first and second mattress openings extend between the top and bottom mattress surfaces within the second mattress portion; and supporting a first and second user in the face down orientation with the head of the first user arranged at least partly on the second mattress portion and at least partly within the first opening and the head of the second user arranged at least partly on the second mattress portion and at least partly within the second opening.

17. A method as recited in claim 11, in which:

the step of providing the mattress system comprises wherein the first mattress portion defines a first width and the second mattress portion defines a second width; and configuring the first width to equal the second width.

18. A method as recited in claim 11, in which:

the step of providing the mattress system comprises the steps of providing first and second mattresses defining the first and second mattress portions, respectively;

the first mattress is adapted to be supported by the primary frame assembly; and the second mattress is adapted to be supported by the secondary frame assembly.

19. A method as recited in claim 11, in which the step of providing the mattress system comprises the step of providing a single mattress defining the first and second mattress portions.

* * * * *